Nov. 5, 1968  F. A. GUERTH  3,409,853
METHOD AND APPARATUS FOR PRODUCING DUPLICATE MAGNETIZED
ARTICLES AND ARTICLES PRODUCED THEREBY
Filed Oct. 14, 1966
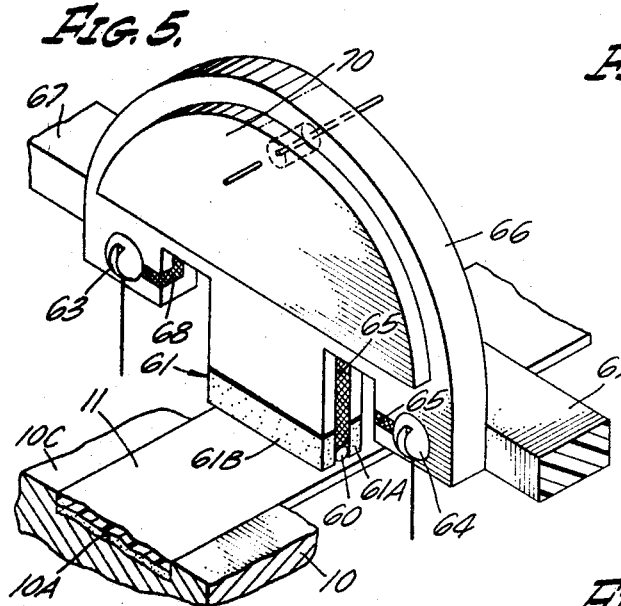
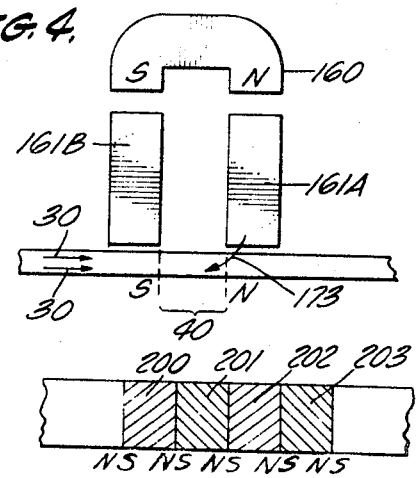
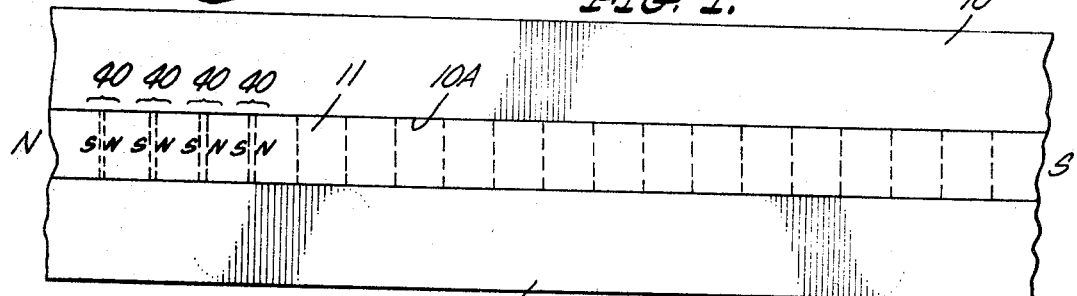
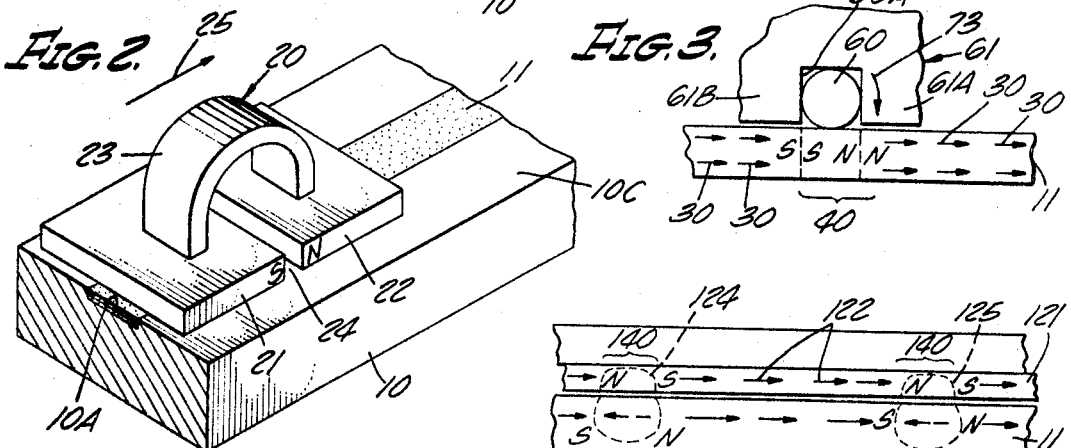
INVENTOR.
FRITZ A. GUERTH
BY Lyon & Lyon
ATTORNEYS

United States Patent Office 3,409,853
Patented Nov. 5, 1968

3,409,853
METHOD AND APPARATUS FOR PRODUCING DUPLICATE MAGNETIZED ARTICLES AND ARTICLES PRODUCED THEREBY
Fritz A. Guerth, San Pedro, Calif., assignor to G. L. Collins Corporation, a corporation of California
Filed Oct. 14, 1966, Ser. No. 591,370
13 Claims. (Cl. 335—284)

ABSTRACT OF THE DISCLOSURE

A measurement standard, like a ruler, is produced by magnetizing accurately spaced regions of an elongated rigid magnetizable medium. Duplicates of such standard so made may be produced by juxtapositioning a like rigid magnetizable medium on such standard to correspondingly magnetize regions on such duplicate using a magnetic "printing" technique.

---

The present invention relates to means and techniques useful in providing a measurement standard and also for producing duplicates of such standard.

It is oftentimes desirable, for the control of machine tools and the like, to provide a medium on which different index marks are located, such marks being spaced predetermined distances. Such controls are discussed in more detail in my copending application Ser. No. 504,047, filed Oct. 23, 1965, and assigned to the same assignee. In accordance with features of the present invention, index or reference marks are produced magnetically in a structure which may be termed a standard from which duplicate records are producible in accordance with other features of the present invention.

It is therefore a general object of the present invention to provide means and techniques whereby the above-indicated results may be achieved.

A specific object of the present invention is to provide means and techniques for producing index or reference marks in a magnetizable medium.

Another specific object of the present invention is to provide means and techniques of this character whereby accurate duplicates are readily made from a standard of the character indicated in the previous paragraph.

The features of the present invention which are believed to be novel are set forth with particularly in the appended claims. This invention itself, both as to its organization and manner of operation, together with further objects and advantages thereof, may be best understood by reference to the following description taken in connection with the accompanying drawings in which:

FIGURE 1 is a top plan view of a portion of a measurement standard produced in accordance with features of the present invention, the dotted lines therein representing invisible magnetic markings with each pair of such dotted lines representing one mark;

FIGURE 2 is a perspective view of a portion of the measurement standard shown in FIGURE 1 with a polarization device mounted thereon in the process of conditioning the same preparatory to placing magnetic markings thereon;

FIGURE 3 illustrates one manner in which the magnetic lines illustrated in FIGURE 1 may be produced using electric current with the apparatus shown in FIGURE 5;

FIGURE 4 illustrates a modified arrangement for producing the lines in the standard shown in FIGURE 1, using in this instance a movable permanent magnetic structure which bridges a pair of pole pieces;

FIGURE 5 is a perspective view of apparatus which may be used either to produce the magnetic lines of FIGURE 1 or to read out or detect the presence of such lines during subsequent readout or detection;

FIGURE 6 illustrates a series of accurate magnetized gauge blocks in abutting relation with unlike poles on abutting faces for the production of the accurately spaced index marks of magnetic character in accordance with other features of the invention;

FIGURE 7 is used in explaining the duplication process.

The standard shown in FIGURES 1 and 2 involves a rigid base member 10 having a grooved portion 10A formed centrally in its upper face, there being a magnetizable material 11 within such grooved portion 10A. The base 10 may, for example, be in the form of an aluminum bar having a width of 2 inches and a height of ¾ inch. The depth of the grooved portion 10A may, for example, be originally 60 mils (.060″). The magnetiable medium 11 may take different forms and, for example, may be in the form of a ½ inch magnetizable tape maintained within such grooved portion 10A by an epoxy cement. Instead of using a tape, such grooved portion 10A may be filled with a magnetizable powder which is pressed into such grooved portion 10A. In either case, preferably the upper surface or face 10C of the base 10 and the exposed upper surface of the magnetizable medium 11 is ground smooth so that their exposed surfaces are smooth and coplanar and such grinding process may involve taking 50 mils of the material from such surface 10C in which case the ultimate thickness of the magnetizable tape or powder 10A is approximately 10 mils (.010″) thickness.

After this insertion of magnetizable material on a non-magnetizable base, as previously described, the magnetizable medium 11 is preferably polarized in a predetermined direction using, for example, the auxiliary tool 20 which includes two flat rectangular bars 21, 22 joined by a permanent magnet 23 such that north (N) and south (S) poles are present at adjacent faces of the bars 21, 22 which are spaced as indicated to provide the air gap 24 between such spaced surfaces.

In use, this tool 20 resting on the upper surfaces of the magnetizable medium 11 and base face 10C is moved in the direction indicated by the arrow 25 for the purposes of achieving a magnetic polarization of the magnetizable material 11 in a predetermined direction as indicated by the N and S signs in FIGURE 1 and also by the series of arrows 30 in FIGURE 3. Thus, the result of the use of this tool 20 is that the magnetizable strip 11 is initially magnetized uniformly throughout its length such that a north pole appears at one end and a south pole appears at the other end.

The series of invisible lines 40, a pair of which represents a mark, is then magnetically made using either the apparatus shown in FIGURES 3 or 4, each of such marks 40 being indicated in FIGURE 1 by two very closely spaced lines having the designations S and N in FIGURES 1 and 3.

In FIGURES 3 and 5, as also described in my above-mentioned copending application, a single wire 60 is disposed within a grooved portion 61A of a pole piece 61 with such wire 60 extending transversely of the magnetizable medium 11. The wire 60, while shown as being a round wire, may be of square or rectangular cross section so as to more completely fill the grooved portion 61A. In either case, the ends of the wire 60 are connected to terminals 63, 64 via, for example, conductors in the form of copper 65 deposited on a base member 66 of generally arcuate construction with the lower end portions being secured to a fixed element 67, the terminal 64 being connected to one end of wire 60 by such copper conductor 65 and the other end of wire 60 being connected to the other terminal 63 through the copper coating 68. For all intents and purposes, this wire 60 is maintained stationary with respect to the magnetizable strip 11 during the time that the reference marks or lines 40 are being produced in which case the crystal 70 is in its deactivated or deenergized condition. With the wire 60 thus maintained stationary the passage of a pulse of current through the wire 60 results in a change in the magnetization of the magnetizable medium 11 in the manner indicated in FIGURE 3. In FIGURE 3 the passage of current through the wire 60 is downward, i.e., perpendicular to the plane of the paper in which case, using the right hand flux rule, such current produces a flow of counterclockwise flux indicated generally by the arrow 73 and this flux 73 flows through a path which includes the pole pieces 61A, 61B which is in the nature of a yoke and straddles the wire 60. More precisely, such current-produced flux may be considered to flow from the pole piece 61A through the magnetizable medium 11 upwardly through the other spaced pole piece 61B and through the body portion of the pole piece 61 to the other pole piece 61A. This flow of flux changes the magnetized condition of the medium 11 with the result that spaced north and south poles S and N are produced. The spacing between such north and south poles N and S is substantially the same as the width of the slotted portion 61A. While there is a finite spacing between the north and south poles so produced, this spacing may be very small using a current-carrying conductor 60 of very small diameter and hence a very small spacing between pole pieces 61A, 61B.

The same result can be accomplished using the arrangement shown in FIGURE 4 wherein the spaced pole pieces 161B, 161A (corresponding to the pole pieces 61A, 61B in FIGURE 3) are bridgeable by a movable U-shaped permanent magnet 160. These pole pieces 161A, 161B are maintained in fixed spaced relationship with each other but are movable as a unit to different positions along the magnetizable tape 11 at which time the faces of the pole pieces contact the magnetizable material 11; and when so positioned the movable permanent magnet is moved to bridge the upper faces of the pole pieces 161A, 161B to produce a magnetic flux indicated by the arrow 173 to again produce a line 40 characterized by the very small spacing between the north and south poles, N and S. The pole pieces 61A, 61B in FIGURE 3 and 161A, 161B in FIGURE 4 may be of ferrite material. Also, perferably, the magnetizable medium 11 has a relatively low magnetic permeability and high coercive force and may, for example, be of the material supplied by Arnold under its designations Arnox 3 or 5. The use of a magnetizable material having a magnetic permeability which is low and preferably one which has a magnetic permeability of one and not greater than two is to achieve sharply defined north and south walls of considerable depth in the medium 11.

Duplicates may be made from the master as illustrated in FIGURE 7 wherein the magnetizable medium 11 having the lines 40 therein is in position underneath a magnetizable tape 121 which is preferably polarized initially in the direction indicated by the arrows 122. The magnetizable tape 121 contacts the medium 11 and the north and south poles comprising a mark 40 causes a magnetic flux to flow through the medium 11 and tape 121 as indicated by the closed loops 124, 125; and this magnetic flux 124 passing through the tape 121 disturbs the flux pattern in tape 121 to produce the spaced north and south poles N and S therein, such north and south poles formed therein defining a line 140 corresponding to the mark 40 in the master medium 11.

This process of moving the tape 121 into contact with the master medium 11 is considered in the nature of a printing process and in general the same precautions used in ink printing are employed to prevent a "smear." For this latter purpose, the tape 121 when moved relative to the master medium 11, is moved such that there is no component of movement along the length of the tape even when the tape is out of physical contact with the master medium 11. For example, the master medium 11 may be maintained stationary and the medium 121 may be pivoted into contact with the medium 11 without, however, there being movement of the tape in a direction corresponding to its length. To achieve a direct and intimate contact between the abutting faces of the medium 11 and tape 121 a vacuum press may be used with means, however, to prevent relative movement of the tape in a direction corresponding to its length when and as such tape 121 is being moved into and out of engagement with the medium 11.

While the dupe tape 121 is illustrated as being previously magnetized as indicated by the arrows 122, such tape 121 need not be initially magnetized. Preferably, however, the tape 121 is premagnetized as indicated by the arrows 122 so as to achieve a greater output voltage in readout using, for example, the apparatus illustrated in FIGURE 5 which in this instance is vibrated using a crystal to produce such vibration in accordance with teachings expounded in my previously identified patent application.

The tape 121 may be of the conventional type used in magnetic recording in conventional sound recorders, in which case there is usually provided a magnetic oxide coating on one side of a polyester or acetate film and in this case, the oxide side of the tape contacts the medium 11.

A dupe tape 121 thus produced may find many different uses and one of which, for example, in its use in the control of a machine tool. In this case, the dupe tape 121 is secured to, for example, the bed plate of a machine tool in conjunction with a vibrating sensing head of the character shown in FIGURE 5. When a mark 140 is detected by production of a voltage as a result of vibration of the wire 60 adjacent a mark 140, a signal is produced and such signal is used to control the operation of the machine tool.

For precise location of magnetic lines, the arrangement shown in FIGURE 6 may be used and this involves the use of a plurality of contacting precisely manufactured gauge blocks 200, 201, 202, 203 each magnetized permanently or by external means to function as a permanent magnet, these gauge blocks 200–203 being disposed such that adjacent abutting faces are of the opposite magnetic polarity. Preferably ceramic magnets precision ground and lapped are used. Thus, as indicated, the south pole face of gauge block 200 contacts the north pole face of the gauge block 201 which has its north pole face in contacting engagement with the sourth pole face of the next permenent magnet 202. The magnetic discontinuity at the interfaces may be detected using the vibrating structure of FIGURE 5 operated as described in my abovementioned application. As alluded to previously, the master medium 11 and due tape 121 are each preferably premagnetized or polarized prior to making of the magnetic markings thereon for achieving a larger output signal in the subsequent detection process using the vibrating detector of FIGURE 5.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. In an arrangement of the character described a base of nonmagnetizable material, said base having a longitudinally extending open grooved portion in one face thereof; magnetizable material within said grooved portion and having an exposed surface which is substantially flush with said base face; and said magnetizable material having magnetized portions separated by nonmagnetized portions.

2. An arrangement as set forth in claim 1 in which said magnetizable material has a magnetic permeability of less than 2.

3. An arrangement as set forth in claim 1 in which said magnetized portions are produced by the passage of current through a single conductor bridged by a pair of pole pieces.

4. An arrangement as set forth in claim 1 in which said magnetized portions are produced by a pair of spaced pole pieces contacting the magnetizable material with said pole pieces being bridged by a permanent magnet.

5. In the method of producing a strip of magnetizable material in which there are discrete spaced regions of magnetization, the steps comprising magnetizing said strip uniformly throughout its length to produce a polarization thereof extending substantially from one end of the strip to the other; and then subjecting spaced regions of said strip to a magnetic field.

6. The method as set forth in claim 5 in which said sapced regions are magnetized by passage of a current through a single conductor wire extending transversely of said magnetizable strip.

7. The method as set forth in claim 5 in which said magnetized regions are produced by placing a pair of parallel extending pole pieces on and transversely of said strip and then bridging said pole pieces by a permanent magnet.

8. In the method of producing duplicate information in the form of a series of spaced sharp narrow lines of magnetization representative of spaced dimension lines from a first elongated rigid element to a second elongated element the steps comprising magnetizing discrete separated portions of a magnetizable medium in accordance with said information to produce said series of spaced narrow lines and then placing a second magnetizable medium in the magnetic field of the first-mentioned medium to magnetize said second medium to produce a permanent record of said information in said second element.

9. A linear measuring standard comprising an elongated rigid magnetizable means having different spaced portions therealong producing regions of spaced narrow lines of magnetization representative of spaced dimension lines.

10. A measurement standard as set forth in claim 9 in which said elongated rigid means comprises a substantially homogeneous magnetizable material in which spaced portions thereof are magnetized.

11. A measurement standard as set forth in claim 9 in which said means comprises a series of abutting gauge blocks magnetized longitudinally to produce different regions of magnetization at the abutting interfaces of adjacent blocks.

12. A linear measurement standard comprising an elongated rigid magnetizable medium in which different spaced regions therealong are magnetized differently than those portions extending between said regions and comprise a series of spaced narrow regions of magnetization representative of dimension lines.

13. A measurement standard as set forth in claim 12 in which said regions extending between said magnetized regions are polarized.

References Cited
UNITED STATES PATENTS

| | | | |
|---|---|---|---|
| 2,535,480 | 12/1950 | Begun | 274—41.4 |
| 2,881,073 | 4/1959 | Maclay | 274—41.4 |
| 3,021,230 | 2/1962 | Deriaud | 335—284 |
| 3,127,544 | 3/1964 | Blume | 335—284 |
| 3,139,567 | 6/1964 | Atkinson | 335—284 |

GEORGE HARRIS, *Primary Examiner.*